United States Patent [19]
Fisher

[11] Patent Number: 4,752,111
[45] Date of Patent: Jun. 21, 1988

[54] FIBER OPTIC CONNECTOR

[75] Inventor: Jeffrey K. Fisher, Harrisburg, Pa.

[73] Assignee: AMP Incorporated, Harrisburg, Pa.

[21] Appl. No.: 90,806

[22] Filed: Aug. 28, 1987

[51] Int. Cl.$^4$ .......................... G02B 6/36; G02B 6/38
[52] U.S. Cl. ............................ 350/96.21; 350/96.20
[58] Field of Search ................ 350/96.21, 96.20, 96.22

[56] References Cited

U.S. PATENT DOCUMENTS

| | | | |
|---|---|---|---|
| 3,797,911 | 3/1974 | Kogelnik et al. | 350/96 WG |
| 3,947,182 | 3/1976 | McCartney | 350/96 C |
| 4,127,319 | 11/1978 | Forney, Jr. et al. | 350/96.20 |
| 4,167,303 | 9/1979 | Bowen et al. | 350/96.21 |
| 4,176,908 | 12/1979 | Wagner | 350/96.15 |
| 4,178,068 | 12/1979 | Hoover | 350/96.21 |
| 4,208,095 | 6/1980 | Malsot | 350/96.21 |
| 4,233,724 | 11/1980 | Bowen et al. | 29/428 |
| 4,284,449 | 8/1981 | Stone | 156/86 |
| 4,306,765 | 12/1981 | Winzer et al. | 350/96.16 |
| 4,327,964 | 5/1982 | Haesly et al. | 350/96.21 |
| 4,339,290 | 7/1982 | Winzer et al. | 156/159 |
| 4,378,143 | 3/1983 | Winzer | 350/96.15 |
| 4,448,478 | 5/1984 | Matthews et al. | 350/96.21 |
| 4,505,539 | 3/1985 | Auracher et al. | 350/96.15 |
| 4,615,581 | 10/1986 | Morimoto | 350/96.21 |

FOREIGN PATENT DOCUMENTS 149346 12/1978 Japan .
3805079 3/1979 Japan .
54-136346 10/1979 Japan .

*Primary Examiner*—James W. Davie

[57] ABSTRACT

A fiber optic splice connector 10 comprises, optical fibers 22 in colinear alignment at complementary inclined optical contact faces 72 of abutting ferrules 64 biased into engagement with each other by corresponding coil springs 74 in axial compression between corresponding ferrules 64 and strain relief bushings 50 that are secured to fibrous tensile force resisting members 24 of corresponding optical cables 12, the ferrules 64 are held in relative rotational positions by a key 48 in aligned keyways 70 in the ferrules 64, and a bipartite body 14 holds the bushings 50 and the ferrules 64 and the springs 74 in compression, and holds the fibers in slackened condition to allow flexure of the fibers in response to tensile forces applied to the cables 12.

19 Claims, 4 Drawing Sheets

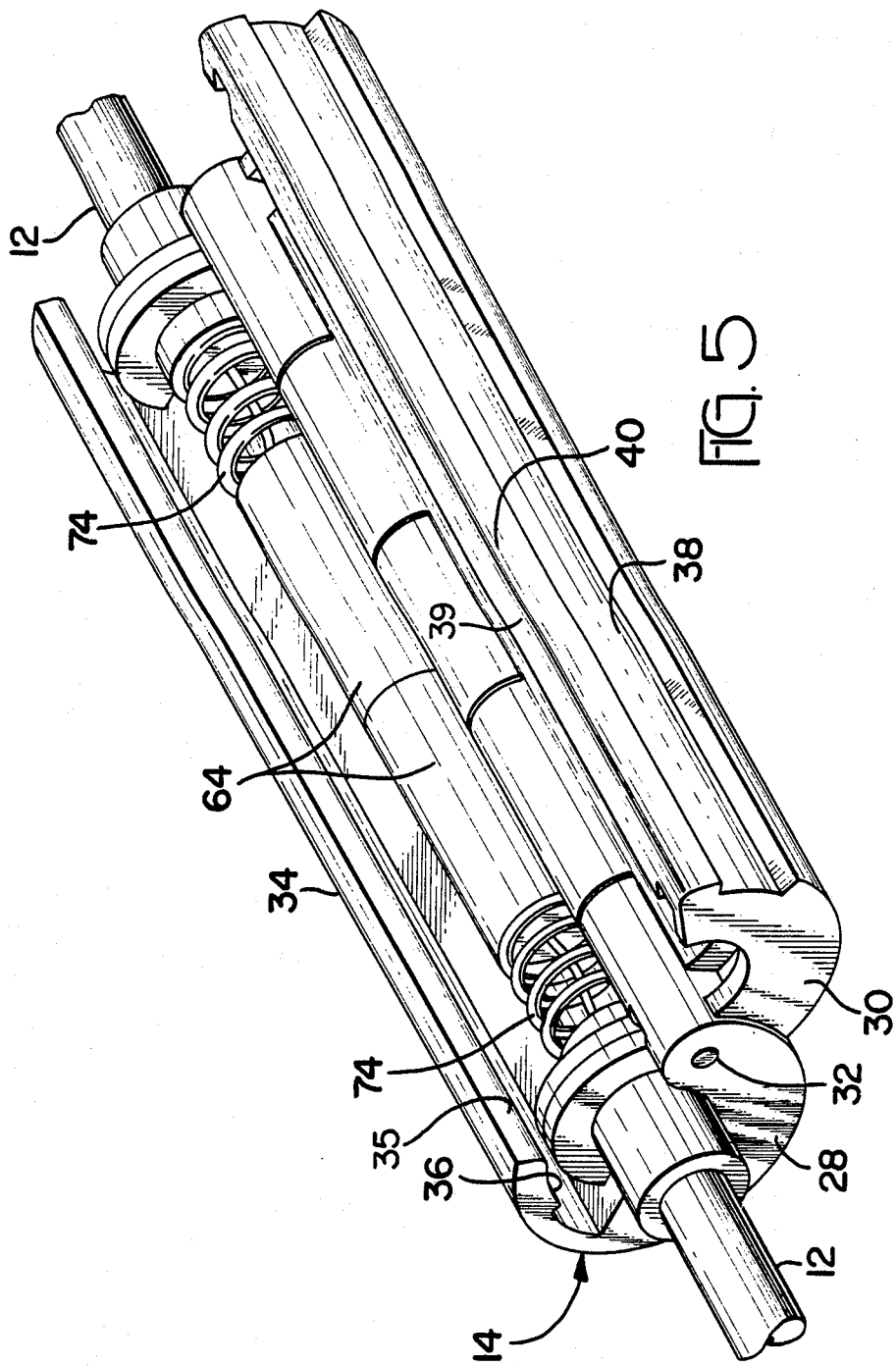

FIBER OPTIC CONNECTOR

The invention relates to an optical fiber connector for forming optical and physical disconnect connections between two optical fiber cables.

Connectors for joining the ends of optical fiber cables are known from U.S. Pat. No. 4,615,581 and Japanese patent number 54-136346 of 10/23/79. In these connectors optical fibers extend from the ends of optical cables and are secured in cylindrical ferrules with the ends of the fibers and the ends of the ferrules at polished contact faces. The ferrules are held in axial alignment within connector bodies with the contact faces abutting each other and with polished ends of the fibers in alignment for transfer of optical signals between the cables. Forces applied to the cables remote from the connector bodies might move the accurately aligned ferrules and disturb the abutting alignment.

An optical fiber connector according to an example of the invention includes a body for accurately orienting two fiber optic ferrules with polished end faces so that ends of optical fibers carried by the ferrules are axially colinear and abut each other. The body is closed on the aligned ferrules and frictionally engages the outer circumference of the ferrules to form a circumferential enclosure for clasping the ferrules. Separate strain relief connections secure the cables to the body. Bowed portions of the optical fibers extend from the ferrules to the ends of the cables secured to the stress relief connections. Tensile forces exerted on the cables are transmitted along the body. The bowed portions of the fibers will flex in response to tensile forces without transferring tensile forces along the bowed portions of the fibers to the ferrules. The connection between the ferrules is undisturbed. A keyway extends along both ferrules and receives a key that aligns the ferrules in fixed positions with respect to angular positions about the axes of the ferrules. Thus, ends of the optical fibers are held in colinear alignment without a requirement that the optical fibers should be precisely concentric with the ferrules.

IN THE DRAWINGS

Two examples of the invention will now be described with reference to the accompanying drawings in which:

FIG. 3 is a transverse sectional view taken along line 3—3 of FIG. 2;

FIG. 5 is a plan view showing the assembly of the first example connector; and

FIG. 6 is a sectional view similar to FIG. 3 illustrating a second example of the invention.

Figure 1:
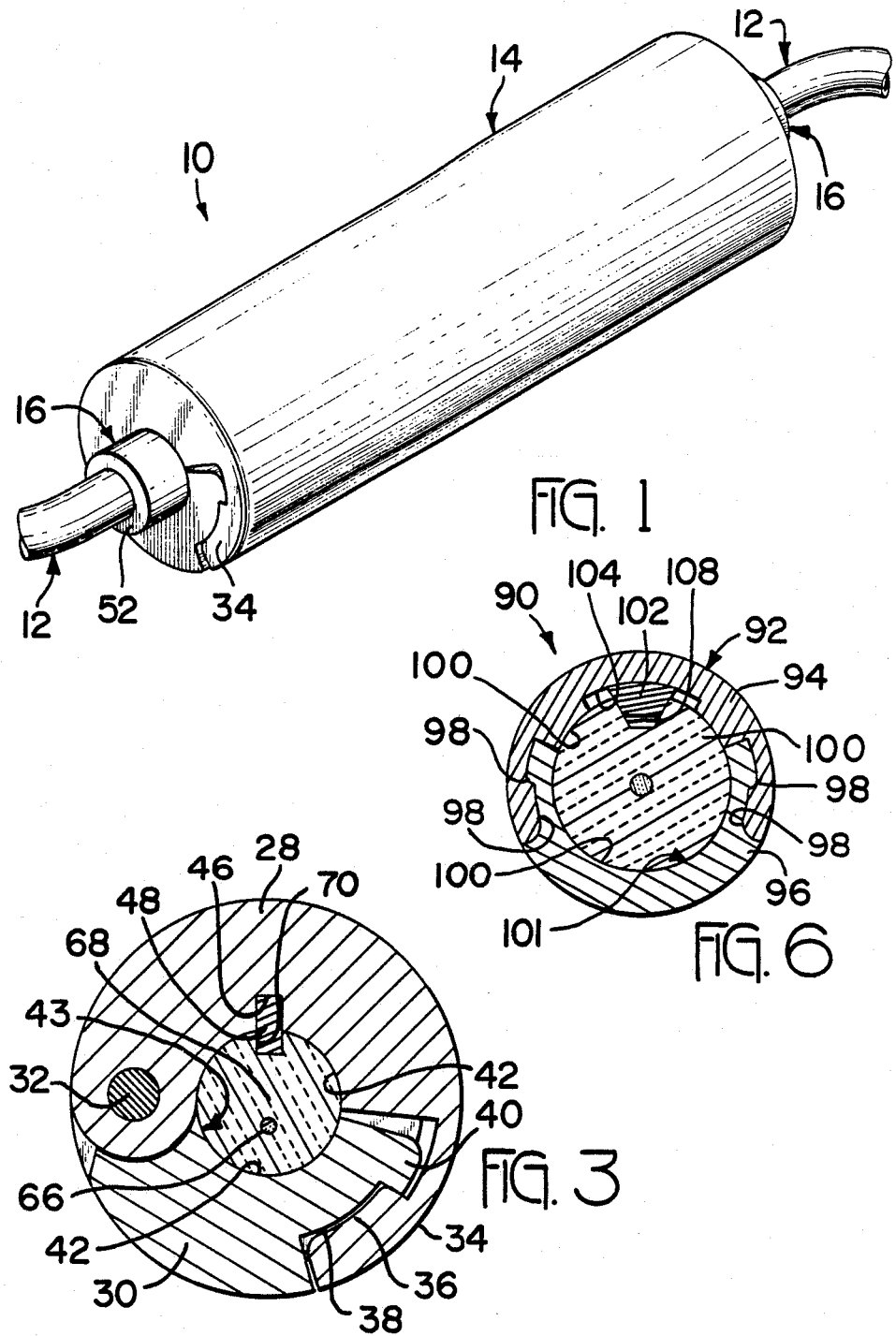
FIG. 1 is a perspective view of a first example of the invention joining the ends of two fiber optic cables.

The first example fiber optic splice connector 10 shown in FIGS. 1 through 5 forms an optical connection between two single strand optical fiber cables 12 and includes cylindrical connector bodies 14, strain relief connections 16 joining the cables 12 to the ends of the bodies 14 and an optical connection 20 between the ends of the optical fibers 22 of corresponding cables 12. Each cable 12 includes a central optical fiber 22, a tensile force resisting, fibrous member 24 surrounding the fibers 22 and an outer sheath 26 surrounding the member 24. Fibers 22 have a diameter of about 0.005 inch and include an optical glass core about 0.0025 inch in diameter and a surrounding protective cladding about 0.005 inch in diameter.

Connector body 14 includes base member 28 and cover member 30. The members are axially elongated and generally C-shaped in transverse cross section. Hinge pin 32 joins the members 28,30 together at adjacent hinge knuckles 33,33 on respective members 28,30 so that the members 28,30 may be pivoted about the hinge pin 33 between an open position shown in FIGS. 4 and 5 and a closed position shown in FIGS. 1 through 3. A flexible latch 34 extends along the edge 35 of body member 28 opposite the edge forming the hinge knuckles 33 and includes a radially extending, inwardly facing locking projection 36. Locking detent 38 extends along the exterior of body member 30 and is spaced from the edge 35 by a lip 40. Pivoting of the members 28,30 toward each other from the open position to the closed position impinges latch 34 against wall 40 so that the latch 34 flexes and allows projection 36 to traverse over wall 40 and fall into detent 38 to hold the body members together in the closed position of FIG. 3. When the body members 28,30 are closed together, their exteriors cooperate to form a cylindrical shaped body 14 with flat ends and segmented cylindrical channels 42 of the body members cooperate to define a cylindrical axially elongated cavity 43.

Semicylindrical recess portions 44,44 intersect the corresponding ends of cavity 43. When members 28 and 30 are closed the recess portions 44,44 form enlarged diameter cylindrical recesses 45,45 at corresponding ends of the cavity 43 and adjacent the ends of the body. A cavity 46 in body member 28 extends parallel to the longitudinal axis of the cavity 43. Elongated rectangular key 48 is mounted with a snug fit in cavity 46 and projects into the cavity 43.

Each cable 12 is prepared for mounting in connector 10 by stripping away a length of the member 24 and a length of sheath 26 from an end of the cable to expose a length of the optical fiber 22. The sheath 26 is removed back further to expose a portion of the member 24. The cable is passed through a strain relief boot 52 and a bushing 50. The end of the fibrous member 24 is expanded radially and overlapped on a reduced diameter alignment sleeve 54, integral with bushing 50. A metal sleeve 56 encircles and is radially compressed over the sleeve 54 and the overlapped fibrous member 24 to secure the fibrous member 24 to the bushing 50. The sleeve 56 also encircles and is radially compressed over the cable sheath 26. The bushing 50 and boot 52 both include enlarged diameter flanges 58 and 60 which fit within a corresponding recess 45. The boot 52 extends from flange 60 along channel 42 and outwardly of the body for engagement with the cable a distance from the body. The boot 52 includes an annular collar 62. The collar surrounds and supports cable 12 and resists sharp bends adjacent the connector. Thereby, a stress relief connection between the connector body and the cable 12 is provided.

The end portion of the optical fiber 22 is secured within a bore 66 extending through the length of a cylindrical ferrule 64. As shown in FIG. 3, bore 66 is offset a distance from the ferrule axis 68. The ferrule 64 also includes a keyway 70 extending parallel to the bore 66 and axis 68 to receive and align with key 48.

Figure 2:
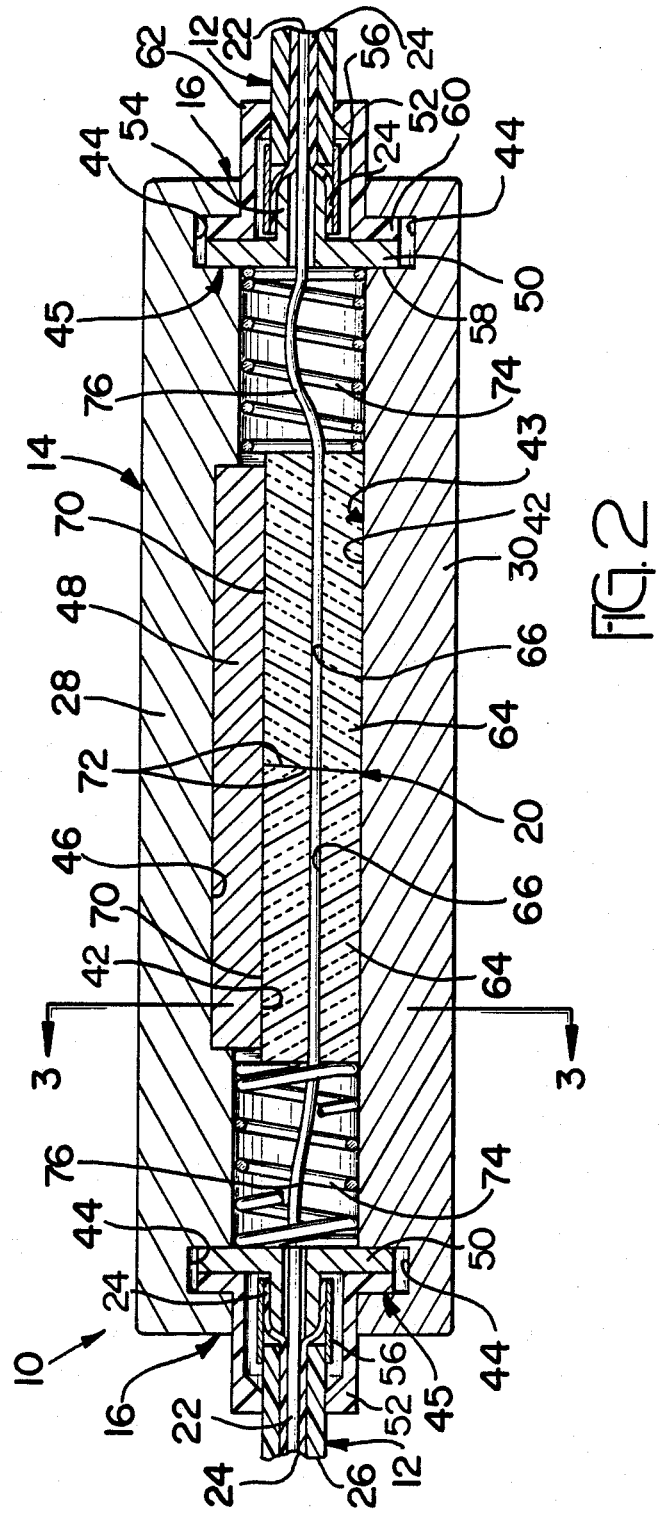
FIG. 2 is an axial sectional view taken through the connector of FIG. 1.
Figure 4:
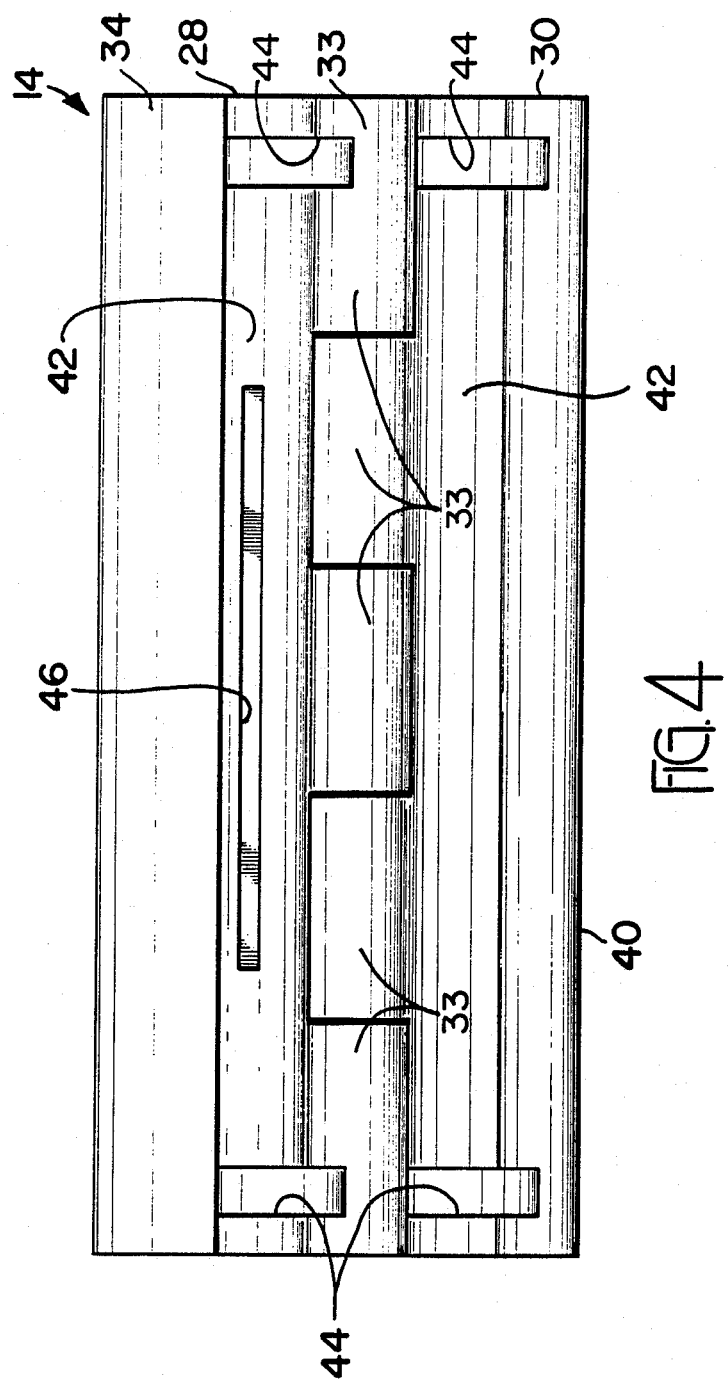
FIG. 4 is a plan view showing the interior of the open, empty body of the first example connector.

The ferrule 64 is connected on the exposed optical fiber a distance from the strain relief connection 16. The end of the optical fiber is inserted in the bore 66. An epoxy-based cement may be used to secure the optical fiber in the ferrule. After the cement has set, the end of the ferrule and the end of the fiber are ground to provide a flat contact face 72 preferably oriented at a slight angle, for example, 6 degrees, to the axis of the ferrule. As indicated in FIG. 2, the faces 72 of two ferrules 64 are inclined at complementary angles so that when the faces of the ferrules are assembled in connector 10 the faces engage flush upon each other. During manufacture of the ferrules 64, the contact faces are finished on the ends of the ferrules, the exteriors of the ferrules are finished to cylindrical shapes, the keyway is provided, and the bores 66 are provided by drilling through both ferrules 64 while the ferrules are aligned by the key 48 in the keyway. Then the bores 66 will extend through the contact faces 72 and will be in colinear alignment at the contact faces 72 even though the bores 66 are offset from the axes of the ferrules 64. Coil springs 74 are engaged by and are confined axially between corresponding bushings 52 and ferrules 64. A length 76 of the exposed optical fiber extends axially through a corresponding spring 74.

Connector 10 is assembled by first positioning key 48 in recess 46 of base member 28, then fitting the stress relief boot and termination bushing flanges 58 and 60 in the recesses 44 at the ends of the base member 30. Then the ferrules 64 are placed in the semi-cylindrical channel 42 with keyways 70 fitted on key 48. The ferrules are the same diameter as the cavity 43 and have a sliding fit in the channel 42. Each spring 74 is compressed axially by engagement with the corresponding bushing 50 and the ferrule 64. Lengths of the optical fibers 76 are slackened and bow as shown in FIG. 2. The compressed springs 74 bias the contact faces 72 into flush engagement with each other. The ends of the key 48 are recessed axially from the ends of the ferrules 64 to assure that the springs engage on the ferrules and urge the ferrules axially to engage the contact faces 72.

The circumference of the ferrules conform to the shape of the channel 42. The key and keyway 48, 70 holds each ferrule in a known rotational position in the cavity so that the ends of the optical glass cores of the optical fibers are colinearly aligned and abut each other to provide efficient light transmission at the optical connection 20. The springs bias the contact faces 72 together in contact at the connection while the body is open.

Following assembly of the connector as shown in FIG. 5, the two body members 28 and 30 are pivoted about hinge pin 32 and are closed on each other so that the locking projection 36 fits in detent 38 and holds the body members together in the cylindrical shape shown in FIG. 1. When the body members are closed, the channels 42 frictionally engage the outer circumferential surfaces of ferrules 64 and frictionally clasp the ferrules and prevent shifting of the ferrules from the properly aligned positions. Key 48 retains the ferrules in proper rotational position.

The shallow angle of faces 72 assures that any light that emerges from an optical fiber and is reflected at the connection 20 does not travel directly in reverse along the fiber.

The parts of connector 10 are all manufactured to precise dimensional tolerances in order to assure extremely accurate, abutting colinear alignment of the two optical fibers at connection 20. In the illustrated connector 10, body members 28 and 30, key 48, springs 74 and termination bushings 52 may be formed from suitable metal while ferrules 64 may be precision-formed from ceramic material. The strain relief boot may be molded from a suitable plastic material. Other materials may be used if desired. The connector 10 is primarily intended for forming an efficient light-transmitting connection between two glass fibers. If desired, the connector may be used to form a connection between other types of optical fibers. One or more optical fiber pairs may be joined in a single connector by providing a number of aligned pairs of fiber optic bores 66 in the ferrules 64.

FIG. 6 illustrates a second example fiber optic splice connector 90 similar to first example fiber optic splice connector 10. Connector 90 includes an elongate cylindrical body 92 comprising base member 94 and cover member 96 which is removably attached to the base member by two pairs of interlocking connection members 98. Members 98 are like the connection members 36 and 40 of connector 10 illustrated in FIG. 3. The base and body members 94 and 96 are separate parts. The members each include a semi-cylindrical interior channel 100 defining a cylindrical cavity 101 extending along the length of the body when the members are interlocked together as shown in FIG. 6. A beveled longitudinal key 102 is fitted in a recess 104 in base member 94. The ferrules 64,64 are modified to include beveled keyways 108 which have a snug fit with the inner edges of the key 102.

We claim:

1. A fiber optic connector for joining two fiber optic cables, the connector comprising a base member having a ferrule-receiving channel with orienting means for rotationally orienting ferrules in the channel and two stress relief recesses located adjacent the channel on opposite sides of the ferrule orientation means; a cover member having ferrule contact surfaces; closure means for securing the members together in a closed position with the ferrule contact surfaces overlying the channel; and a pair of like cable assemblies, each assembly including a fiber optic cable having an end, a length of fiber optic strand extending beyond the end of the cable, a ferrule secured to the end of the strand a distance from the end of the cable, a stress relief member secured to the end of the cable free of the strand and a spring between the ferrule and the stress relief member; the ferrules having complimentary contact faces with the ends of the strands lying on the faces and surfaces engagable with the orienting means; each cable assembly being mounted in the body member with the ferrules in the channel, the stress relief members engaging the stress relief recesses to form physical connections between the cables and the body members, the portions of the fiber optic strands extending from the ends of the cables to the ferrules being slack and the springs being compressed between the ferrules and the stress relief members, whereby when the base and cover members are open the springs bias the ferrules toward each other and the surfaces engage the orienting means so that the ferrules are aligned in abutting contact with the ends of the strands overlie each other in position for transmission of light between the cables and when the closure means secure the base and cover together in a closed position the ferrule contact surfaces and channel frictionally engage the ferrules to prevent movement of the ferrules in the channel from the aligned position and the slack portions of the fiber optic strands isolate the optical connection from stresses applied to the cables and assembled body and cover members.

2. A fiber optic connector as in claim 1 wherein the springs surround the fiber optic strands.

3. A fiber optic connector as in claim 2 wherein the cover member includes second ferrule-receiving channel, the ferrule contact surfaces lie on part of such channel, said channels defining a straight open-ended cavity when the base and cover members are in the closed position, the ferrules having a snug fit within the cavity.

4. A fiber optic connector as in claim 3 wherein the cavity and ferrules are cylindrical.

5. A fiber optic connector as in claim 4 wherein the orienting means comprises a key in the channel adjacent each ferrule and the surfaces comprise slots in the ferrules each having a snug fit with an adjacent key.

6. A fiber optic connector as in claim 5 wherein the orienting means comprises a continuous key extending along the channel adjacent the ferrules, the axial length of the key being less than the axial length of the ferrules so that the springs do not engage the key.

7. A fiber optic connector as in claim 4 wherein each stress relief recess comprises a circumferential groove extending around the cavity and each stress relief member comprises a bushing having a circumferential flange fitted in one of the grooves and an alignment sleeve extending toward the adjacent end of a fiber optic cable, each fiber optic strand extending freely through an adjacent bushing and including a physical connection joining the end of each fiber optic cable to the adjacent bushing.

8. A fiber optic connector as in claim 4 wherein the closure means includes a hinge joining the base and cover members located on one side of the cavity and a latch connection on the other side of the cavity.

9. A fiber optic connector as in claim 4 wherein the closure means includes a pair of latch connections located on opposite sides of the cavity.

10. A fiber optic connector for joining the ends of two fiber optic cables, the connector comprising a body having a pair of members and closure means holding the members together at an interface, the body including an open ended cavity extending between the members at the interface and ferrule orienting means in one member on the cavity; a pair of fiber optic cables each having an end located adjacent an end of the cavity; a stress relief connection joining each cable end to the body, each cable including a stripped fiber optic strand extending into the cavity from the end of the cable free of the adjacent stress relief connection; a pair of like ferrules in the center of the cavity spaced from the stress relief connections, each ferrule having an contact face abutting the complementary contact face of the other ferrule and a surface engagable with the ferrule orienting means to orient the ferrule rotationally within the one member prior to and during closing of the body by the closure means, spring means in the cavity for biasing the ferrules together so that the contact faces are in flush, aligned engagement prior to and during closing of the body, the fiber optic strands extending through bores in the ferrules and having ends lying on the contact faces, said strand ends overlying each other for transmission of light between the cables, the fiber optic strands being slack between the stress relief connections and ferrules; and a circumferential frictional clasp connection between each ferrule and the body, the clasp connections securing the ferrule in place in the cavity against longitudinal movement to maintain light-transmitting alignment between the ends of the fiber optic strands, whereby the stress relief connections and body form a physical connection joining the ends of the cables and the slack portions of the fiber optic strands isolate the optical connection from stresses applied to the cables and body.

11. A fiber optic connector as in claim 10 wherein the channel is straight adjacent the ferrules and each clasp connection between the body and a ferrule lies on a cylindrical surface.

12. A fiber optic connector as in claim 11 wherein the spring means comprise a spring surrounding one fiber optic strand and having an end biasing one ferrule toward the other ferrule.

13. A fiber optic connector as in claim 12 wherein the other end of the spring engages the adjacent stress relief connection.

14. A fiber optic connector as in claim 12 including a second spring surrounding the other fiber optic strand and having an end biasing the other ferrule toward said one ferrule.

15. A fiber optic connector as in claim 10 wherein the ferrule orienting means comprises the key in the channel adjacent each ferrule and the surface comprises a slot in each ferrule having a snug fit with a key.

16. A fiber optic connector as in claim 15 wherein the orienting means comprises a continuous key extending along the channel adjacent the ferrules, the axial length of the key being less than the axial length of the ferrules whereby the spring means does not engage the key.

17. A fiber optic connector as in claim 10 wherein each stress relief connection includes a circumferential groove in the body extending around the cavity and a bushing having a flange fitted in the groove and an alignment sleeve extending toward the adjacent end of a fiber optic cable and a physical connection joining the bushing to the cable end free of the fiber optic strand.

18. A fiber optic connector as in claim 10 wherein the closure means includes a hinge joining the members on one side of the cavity and a latch connection joining the members on the other side of the cavity.

19. A fiber optic connector as in claim 10 wherein the closure means comprises a pair of latch connections located on opposite sides of the cavity.

* * * * *